United States Patent [19]

Underberg

[11] Patent Number: 4,650,324
[45] Date of Patent: Mar. 17, 1987

[54] LEVEL TRANSIT

[75] Inventor: Robert L. Underberg, Mequon, Wis.

[73] Assignee: Realist, Inc., Menomonee Falls, Wis.

[21] Appl. No.: 705,183

[22] Filed: Feb. 25, 1986

[51] Int. Cl.$^4$ .............................................. G01C 1/10
[52] U.S. Cl. ...................................... 356/149; 33/283
[58] Field of Search ............... 33/281, 283; 356/143, 356/148, 149, 250

[56] References Cited

U.S. PATENT DOCUMENTS

| | | | |
|---|---|---|---|
| 2,841,047 | 7/1958 | Ellenberger | 356/250 |
| 2,938,422 | 5/1960 | Hardy | 356/250 |
| 3,628,874 | 12/1971 | Tagnon | 356/250 |
| 3,663,111 | 5/1972 | Tsuda et al. | 356/250 |

FOREIGN PATENT DOCUMENTS

| | | | |
|---|---|---|---|
| 178209 | 4/1954 | Austria | 356/250 |
| 2126212 | 12/1972 | Fed. Rep. of Germany | 356/250 |
| 531233 | of 1955 | Italy | 356/250 |
| 144613 | 3/1962 | U.S.S.R. | 356/250 |

Primary Examiner—F. L. Evans
Assistant Examiner—Joel L. Harringa
Attorney, Agent, or Firm—Bayard H. Michael

[57] ABSTRACT

The telescope of the level-transit includes two mirrors at 45° to the light path. A first mirror is fixed in the telescope housing by screws which thread into the mirror support to pull it tight against a datum surface established by a cover. The other mirror is mounted for pendulating action to automatically compensate the instrument for deviation from level within the design range. When the instrument is used as a transit the telescope is free to tilt up and down to measure vertical angles. At that time the pendulum is locked in center position. When the instrument is used as a level, the telescope is locked against elevation or depression. The locking mechanism actuates a device which frees the pendulum for operation to automatically compensate the level. The bottom of the pendulum weight has an inverted conical member fixed therein. The conical portion passes through an elongated hole in a leaf spring fixed in the telescope to flex about an axis transverse the mirror pivot axis. The hole is parallel to the pivot axis. The spring is self biased to engage the conical portion to center the weight. The telescope locking mechanism lifts the spring off the conical portion.

12 Claims, 12 Drawing Figures

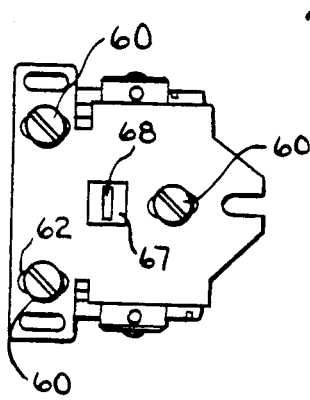
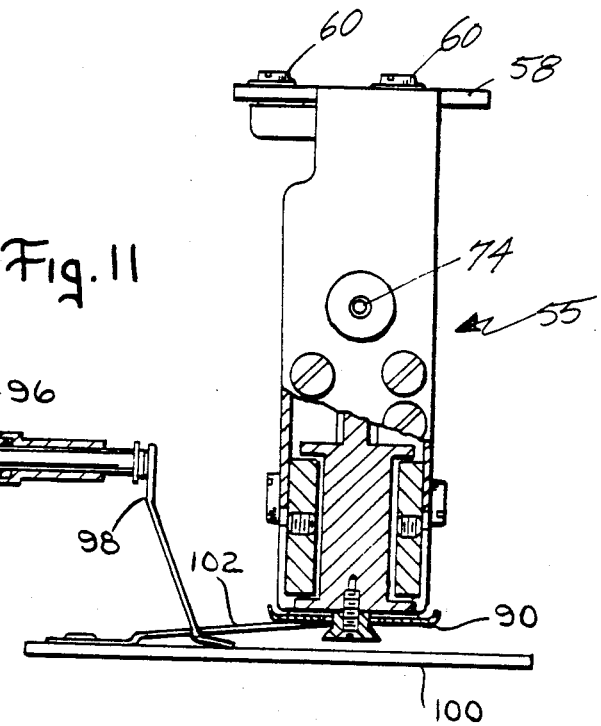
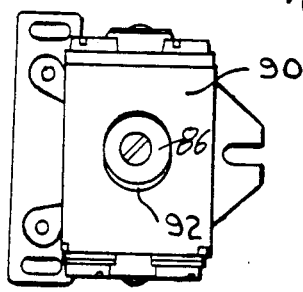
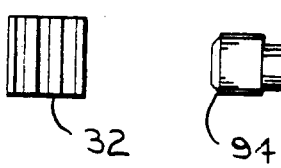
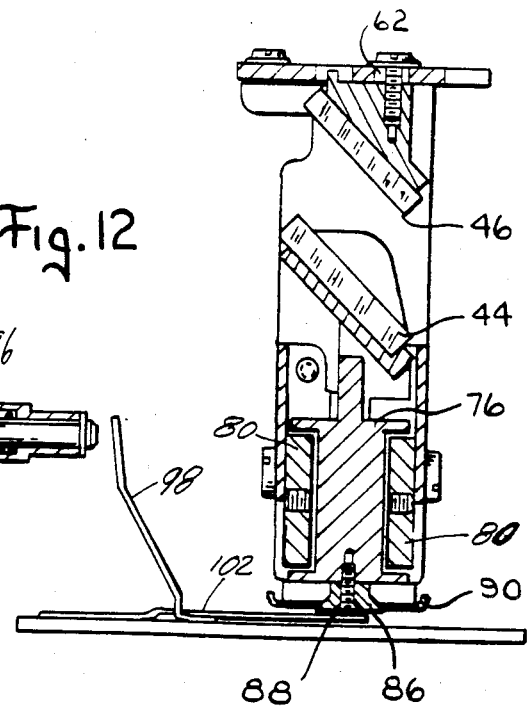

LEVEL TRANSIT

BACKGROUND OF THE INVENTION

Telescope-type levels used in surveying must be leveled accurately before use in taking sightings. This is time consuming but necessary. If then the user slightly bumps the instrument or tripod, or even shifts his weight the leveling must be repeated. Recently automatic compensation for slight misalignment has been built into levels. This compensation is based on pendulating optical elements in the level. This shortens the set-up time and minimizes having to re-level the instrument during use. The telescope is fixed in a level plane and the instrument is used to determine level sights and horizontal angles. The fixed mirror in levels having automatic compensation must be adjusted at the factory. The typical adjustment results in the mirror being suspended, in effect, by adjusting screws. This can be unstable due to differential heat expansion or relaxation of strains in the adjusting means.

A transit is an instrument used for determining horizontal and vertical angles.

A level-transit is a combination instrument which combines both instruments with some loss of precision and magnitude in measuring vertical angles (typically measuring up to 45° elevation or depression). This makes a very useful instrument. When it is used as a level, the telescope is locked parallel to the rotating platform and the instrument must then be just as carefully leveled (the platform is leveled) as with a level not provided with automatic compensation. Automatic compensation has been incorporated in a level-transit but was complicated and was not accepted in the market. It used a fixed and a pendulated prism which resulted in a cumbersome pendulation system.

SUMMARY OF THE INVENTION

An important feature of this invention is to provide automatic compensation for a level transit having an alidade which includes a platform which is leveled in use and also includes an arrangement for locking the telescope in a position parallel to the platform when the instrument is to be used as a level. The automatic compensation includes optical pendulation of a portion of the telescope optics when the telescope is locked in the parallel position. An inverted conical member is secured to the bottom of the pendulum and projects through an elongated hole in a leaf spring fixed adjacent the pendulum with one end free. The spring is biased to engage the conical surface to prevent pendulation and center the pendulum when the telescope is unlocked for use in the transit mode. When the optical system is locked against pendulation it is centered or "zeroed" in the "plumb" position so it does not introduce errors (which would be up to the compensation limit . . . 20 minutes of arc in this design). When the instrument is to be used in the level mode the telescope is locked in position by closing a locking lever to its operative position engaging a lock plate. This action actuates a plunger which engages a finger to lift the leaf spring from the conical member to free the pendulum for action.

A further feature is to provide an improved adjustment for the fixed mirror in an automatically compensated level telescope. More specifically, this invention provides an adjustable mirror mount for an automatically compensated level telescope in which the adjusted mirror is fixed on a solid mounting block which is drawn tight against a datum surface after being moved relative to light path to optimize the adjustment.

BRIEF DESCRIPTION OF THE DRAWINGS

FIG. 9 is a top plan view of the mirror subassembly and mounting plate.

FIG. 10 is a bottom view of the mirror subassembly.

FIG. 11 is a schematic illustration of the locking mechanism with the pendulum unlocked.

FIG. 12 is similar to FIG. 11, but shows the pendulum locked against movement.

DETAILED DESCRIPTION OF THE DRAWINGS

Figure 3:
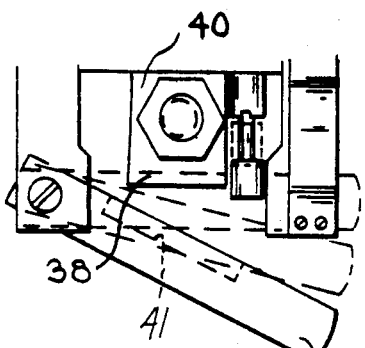
FIG. 3 is a detailed view showing the locking lever.
Figure 2:
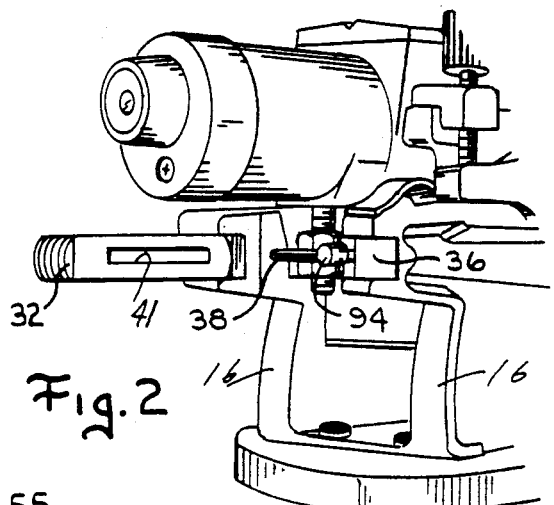
FIG. 2 is a partial perspective view of the instrument.
Figure 4:
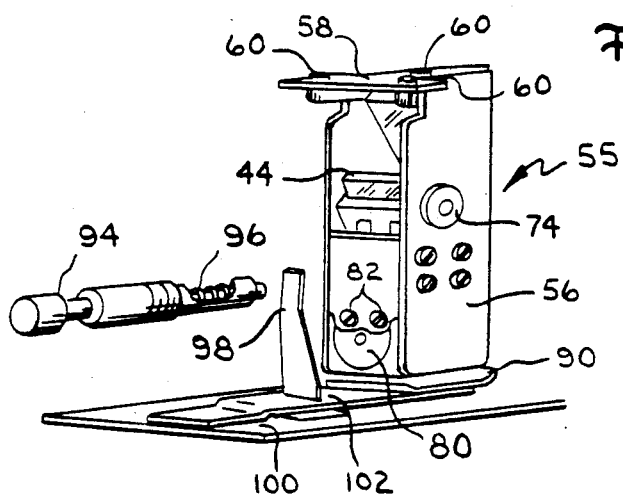
FIG. 4 is a perspective view showing the manner in which the locking plunger actuates the lock actuator and the relationship to the mirror subassembly.
Figure 1:
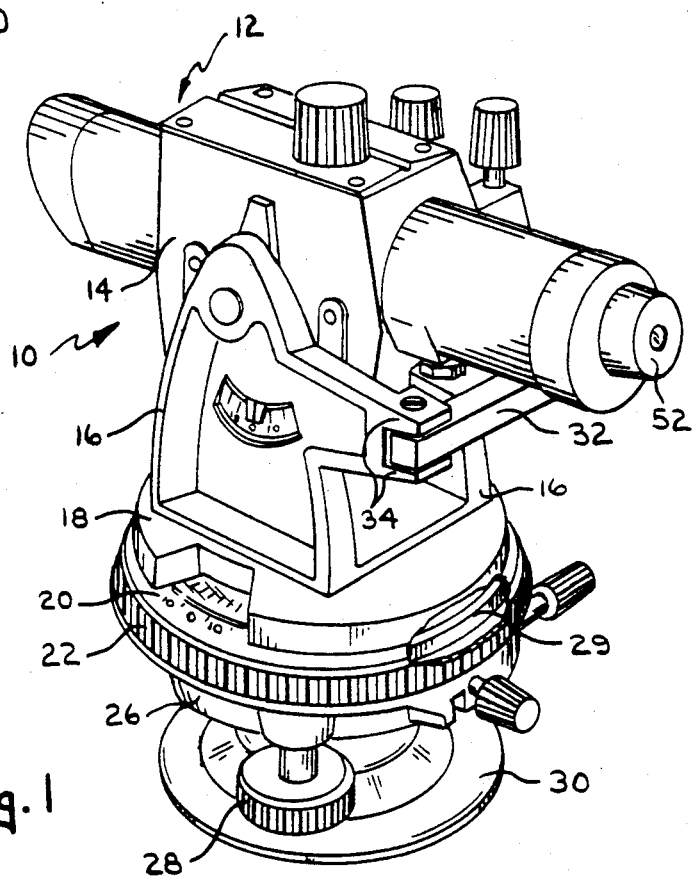
FIG. 1 is a perspective view of an instrument provided with this invention.

The level transit 10 has a telescope 12 in a housing 14 mounted for tilting movement about the horizontal axis of the trunnions 16 mounted on the platform or top plate 18. The plate 18 is rotatable about a vertical axis to permit measurement of the horizontal angle through which the telescope is moved. The platform 18 rotates relative to the scale 20 on the graduated circle assembly 22 which is, in turn, rotatably secured to the leveling body 26. Circle 29 is secured to platform 18 and is the vertical axis bearing means to the leveling body 26. The leveling body 26 is supported on three leveling screws 28 acting between the body and the base 30 to permit the body 26 to be leveled when the base 30 is secured to a tripod or other support surface.

The foregoing is a very simplified description of the construction and many details are not mentioned since they are not relevant to the present invention. To understand the present invention it is necessary only to understand that when this instrument is used as a level the lever 32 journaled between the spaced bosses 34 which are a part of one of the trunnions 16 is closed into the notch 36 in the other trunnion 16 while receiving the tongue 38 of the lock plate 40 in keeper or slot 41 to securely fix the telescope housing 14 parallel to the top plate so that when the top plate is level the telescope is level.

When it is desired to measure vertical angles, the lever 32 is pivoted to disengage the lock plate. This frees the housing 14 for movement about the horizontal axis and enables reading vertical angles of elevation or depression, usually up to 45° elevation or depression.

Up to this point, the system is essentially standard for a level-transit (although the usual level transit would employ a simple tubular telescope). When this instrument is properly leveled, the light rays from the target enter the objective lens 42 on line WX, X being on the front surface mirror 44 which is pendulated and mounted at substantially 45°, as will appear hereinafter.

Figure 7:
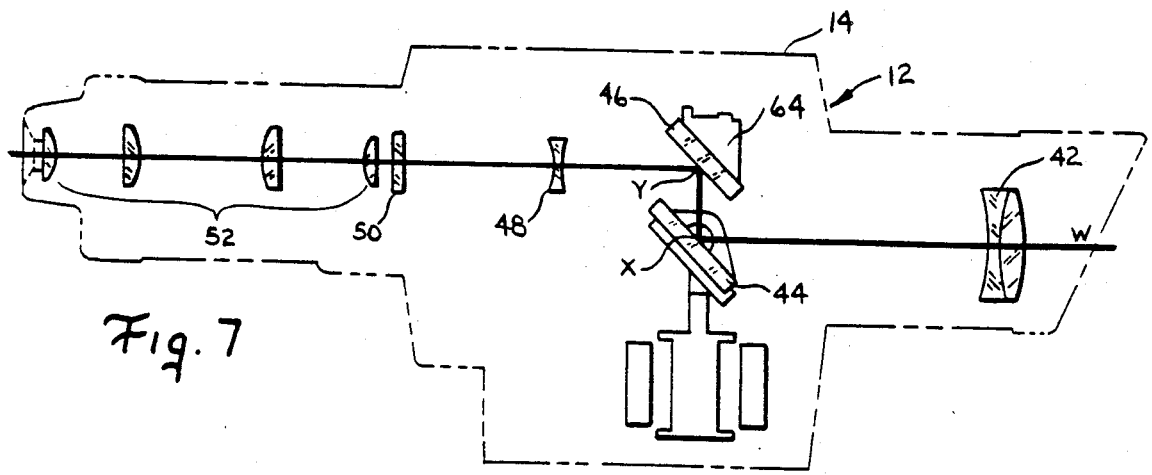
FIG. 7 is a schematic showing of the automatic compensation system with the telescope in level position.
Figure 8:
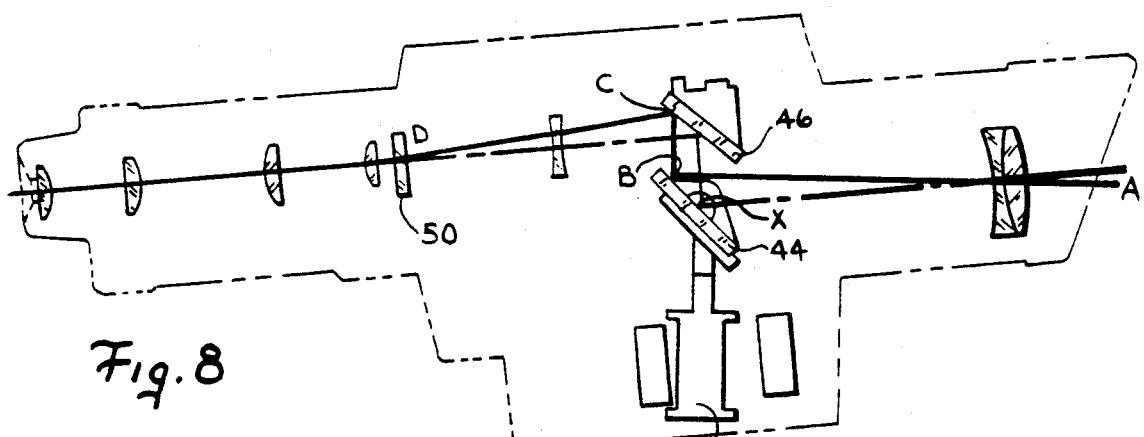
FIG. 8 is similar to FIG. 7, but shows the telescope out of level.
Figure 5:
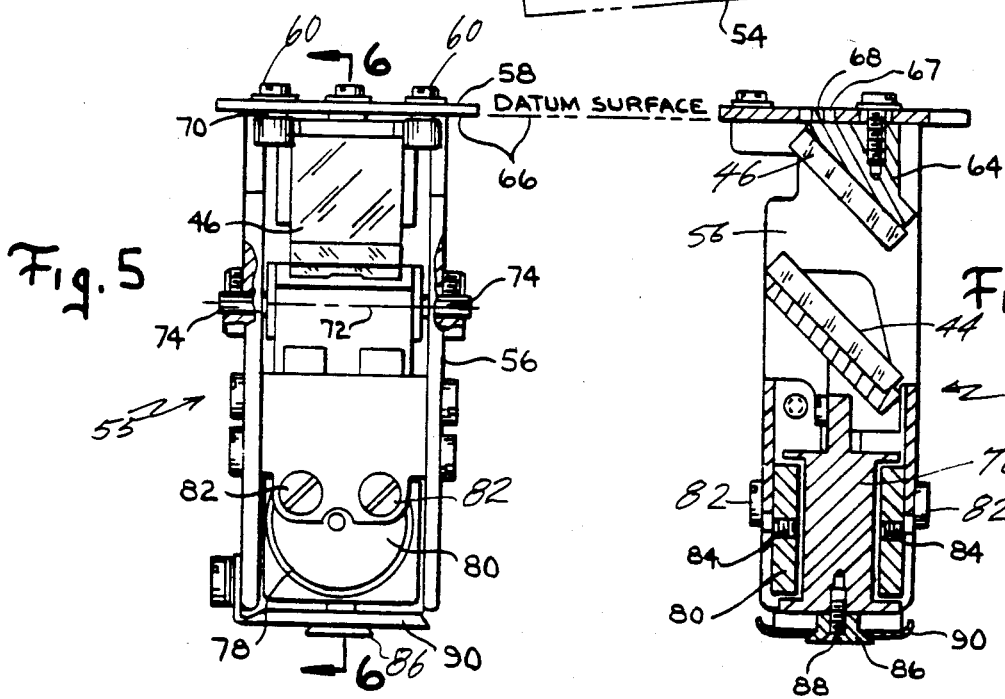
FIG. 5 is a detailed elevation of the mirror subassembly.
Figure 6:
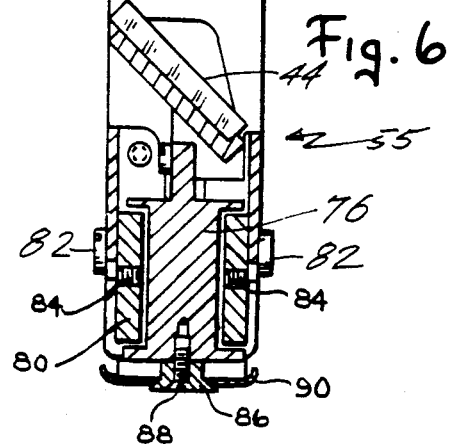
FIG. 6 is a section taken on line 6—6 in FIG. 5.

The 45° pendulated mirror 44 reflects the light up to the fixed 45° mirror 46 at point Y and then is transmitted through the focusing lens 48, the cross hair reticle 50 and the erecting eyepiece 52. To understand the automatic compensation, the optical system is first considered as shown in schematic FIG. 7 with everything plumb or properly leveled. The showing in FIG. 8 is greatly exaggerated in order to show the principle of pendulated correction. Here the light path for a horizontal bundle of light rays coming from the target enter on path AB. It will be noted the point B is no longer dead center (or at X as in FIG. 7). The mirror 44 has been tilted by the pendulum 54 to remain at 45° to true horizontal (level) even through the instrument is not level. This causes the ray BC to strike the fixed 45° mirror off center from Y where it struck in FIG. 7. The light then travels through the focusing lens on the path CD, to strike the normal axis at the center point of the reticle.

It can be demonstrated with the arrangement schematically described that if the pivot axis of the pendulated mirror is in line with the reflecting surface of the mirror, compensation for all tilt angles within the scope or range of deviation from level occurs when the distance between the node of the objective lens and the pivot axis of the pendulated mirror is exactly equal to ½ the effective focal length of the objective lens.

Turning now to the present construction, the compensator and mirror assembly is a subassembly 55 enclosed in a housing 56 with the upper fixed mirror 46 secured to the underside of the cover plate 58 by three adjusting screws 60 each of which passes through an elongated hole 62 in the cover plate 58 to permit adjusting the mirror support 64 (and hence the mirror) longitudinally relative to the topical axis of the optical system. The angle of the mirror is fixed by reference to the datum surface 66 established by the underside of the cover 58. The cover plate 58 is provided with an aperture 67 receiving a lug 68 which is visually centered in the aperture to indicate that the mirror is substantially properly positioned. It will be understood that if the mirror 46 moves left or right in FIG. 7 (and 12), the point at which the light rays coming from the pendulated mirror 44 strike the fixed mirror 46 will also move. This effects adjustment of the optical system. After the mirror 46 is properly positioned the three adjusting screws 60 are tightened to firmly hold the mirror support bosses 70 against the datum surface established by the underside of the cover plate 58. This arrangement is more permanent and will retain its adjustment better than the prior art in which the pendulated compensator is, in effect, suspended from adjusting screws and any differential heat expansion or relaxation of strain in the adjusting screws will directly and adversely affect the adjustment of the mirror.

The pendulated mirror 44 is supported in the compensator assembly on a pivot axis 72 defined by the two stub shafts 74 projecting into the ball bearing assemblies to support the mirror and its pendulum weight 76 for pivotal movement about the axis of the stub shafts. The stub shafts are fixed in place by set screws after the pendulum is properly centered to equalize the very tight air spaces indicated by numeral 78. Dampers are effective on each side of the assembly and comprise pistons 80 fixed to fit into corresponding recepticals in the pendulum weight. The pistons fitting inside the damper recepticles are adjusted by screws 82 to center the pistons to equalize the air gap between the pistons 80 and the pendulum weight 76. When properly adjusted, the air gap between the pistons and the weight is very small and the assembly becomes an air damper. The damper is important in that the ball bearing support for the pendulum would otherwise allow the weight to oscillate for far too long in reaching a stable position. The screws 84 limit pendulum motion, preferably in the neighborhood of 15 to 20 minutes of arc. Thus, the instrument can only compensate for a deviation of 15 to 20 minutes of arc, but in the practicality of surveying, that is a substantial compensation. It means that the set up of the level need not be perfect, but only need to be within 20 minutes to obtain satisfactory readings.

It will be noted that the underside of the pendulum weight is provided with an inverted conical member 86 held in place by screw 88. The frame 56 of the subassembly is provided with a leaf spring 90 having an elongated center aperture 92 in which the inverted conical member 86 is mounted. The elongated opening in the spring is elongated parallel to the pivot axis of the pendulum. Normally, the spring 90 will bear down against the conical surface 86 and prevent movement of the pendulum weight. It holds the pendulum in its centered position. If the opening in the spring was at 90° to the present design the centering would not be as good. Similarly, if the spring is made to flex about a pseudo-axis 90° to the illustrated design, the centering would suffer. When the keeper lever 32 is actuated to lock the telescope, the plunger 94 mounted in the trunnion 16 is moved against the bias of spring 96 to move in against the lock actuator 98 mounted on the bottom cover 100 of the housing 14. This actuator is biased by flat spring 102 to the position shown in FIG. 12. But when engaged by the plunger 94 (as in FIG. 11) the actuator will tilt about its own tilt axis to lift spring 102 upwardly to engage and lift the compensator lock spring 90 towards the pendulum weight and away from the conical member 86, thus freeing the pendulum for movement. When the instrument is to be used as a level, the lock or keeper lever 32 is moved to lock the optical system in the horizontal position and this automatically frees the compensator pendulum for action.

When the instrument is to be used to measure vertical angles, the lock or keeper lever must, of course, be disengaged to permit the telescope to be tilted up or down. When this happens the plunger 94 is withdrawn from the lock actuator 98 and the lock spring 90 returns to its operative position centering the pendulum and therefore returning the pendulated mirror 44 to its "zero" position. Therefore, the pendulated mirror will function as a fixed mirror when the telescope is freed for measuring vertical angles. If the pendulated mirror were not locked in place, an error up to 20 minutes could be introduced into the readings.

To recapitulate, when the level-transit is used as a level, the telescope is locked in place and the pendulum weight 76 for the pendulated mirror 44 is freed up so the automatic compensating feature becomes effective. If the instrument is used to measure vertical angles, the telescope is unlocked. When this is done the compensator pendulum is locked in place to prevent introduction of error. This design keeps the pendulum close to the compensating (pendulated) mirror and the mechanism for zeroing the pendulum is simple and effective.

This invention has an improved adjustment for the fixed mirror. The mount holds its adjustment by reason of tightening screws which pull the mirror mounting block firmly against the datum surface rather than relying on a suspension system.

I claim:

1. A level-transit comprising,
a base,
a platform mounted on said base for rotation about a vertical axis, said platform being leveled in use,
a pair of trunnions on said platform,
a telescope mounted in said trunnions for movement in a vertical plane about the axis of said trunnions when the instrument is used as a transit,
a housing fixed in said telescope,
an optical element having a reflecting surface,
means supporting said element in said housing for movement about a pivot axis parallel to said platform and transverse to the light path through the telescope,
a pendulum weight connected to said optical element and suspended under said pivot axis to position said optical element to reflect light at 45° to the true horizontal,
a leaf spring mounted on said housing and extending under said weight for flexure about a flex axis transverse said pivot axis,
an elongated hole in said spring having its major dimension parallel to said pivot axis,
a lock member having an enlarged head on the side of said spring remote from said weight and having a tapered portion extending through said elongated hole and connected to said weight,
the edges of said elongated hole engaging said tapered portion to lock said weight against movement,
a lock plate fixed relative to said telescope,
a keeper pivotally mounted in one of said trunnions and engageable with said lock plate for locking said telescope in position parallel to said platform when said instrument is used as a level,
means operative in response to engagement of said keeper with said lock plate to lift said spring from said tapered portion.

2. A level-transit according to claim 1 in which said pivot axis is in line with the reflecting surface of said optical element.

3. A level-transit according to claim 2 in which said keeper is received in a notch in the other of said trunnions when said keeper engages said lock plate,
said lifting means including a plunger engaged by said keeper and a lifting finger engaged by said plunger.

4. A level-transit comprising, a base,
a platform mounted on said base for rotation about a vertical axis, said platform being leveled in use,
a pair of trunnions mounted on said platform,
a telescope mounted in said trunnions for movement in a vertical plane about the axis of said trunnions when the instrument is used as a transit, said telescope including an objective lens,
a first mirror fixed in said telescope to reflect light,
a second mirror,
a pivot support for said second mirror in said telescope,
a pendulum weight suspended from said pivot support and fixed relative to said second mirror to maintain said mirror at 45° relative to horizontal to reflect light from said objective lens to said first mirror,
a leaf spring mounted in said telescope and extending under said weight for flexure about a flex axis spaced from but substantially normal to said pivot axis,
an elongated hole in said spring having its major axis substantially parallel to said pivot axis,
a lock member having an enlarged head on the side of said spring remote from said weight and having a tapered body passing through said hole and connected to said weight,
the sides of said hole engaging opposed points on said tapered body to center said weight and prevent pendulation of said mirror,
a keeper lever pivotally mounted adjacent said telescope,
a lock plate fixed relative to said telescope,
said keeper lever engaging said lock plate to lock said telescope against vertical movement,
and means responsive to engagement of said keeper lever with said lock plate to lift said leaf spring off said tapered body to allow said pendulum weight to move.

5. A level-transit according to claim 4 including a housing mounted in said telescope,
said pivot support and leaf spring being mounted on said housing.

6. A level-transit according to claim 5 in which said spring lifting means is mounted in said telescope and includes a plunger actuated by movement of said keeper lever to engage said lock plate.

7. A level-transit according to claim 6 in which said keeper lever is pivoted in one of said trunnions and is closed into a notch in the other of said trunnions,
said plunger being mounted in the body of said telescope,
spring means biasing said plunger outwardly to be engaged by said keeper lever.

8. A level-transit according to claim 7 in which the pivot axis of said pivot support for said second mirror is in line with the reflecting surface of said second mirror.

9. A level-transit according to claim 8 in which said objective lens has a node and an effective focal length,
the distance between said node and said pivot axis is one-half said focal length.

10. A surveying level having a telescope having an objective lens and an eyepiece and including two mirrors at 45° to the light path,
one of said mirrors reflecting light from said objective lens to the other mirror and being mounted for pendulating movement to compensate for deviation of said telescope from true level,
a plate mounted on said telescope and establishing a datum surface,
a rigid support for said other mirror positioning said other mirror to reflect light from said first mirror to said eyepiece,
a plurality of mounting holes through said plate,
each of said holes being elongated in parallel to axis of said telescope,
and adjustment screws projecting through said holes and threaded into said support,
the head of each screw being larger than the hole through which it projects so the support is drawn up tight against said datum surface.

11. A level according to claim 10 in which each screw is threaded into a raised boss on said rigid support, all said bosses being drawn up against said datum surface.

12. A level according to claim 10 including means for selectively fixing said one mirror against movement.

* * * * *